United States Patent [19]

Schindehütte et al.

[11] 3,941,061
[45] Mar. 2, 1976

[54] PNEUMATIC RAILWAY CAR SUSPENSION

[75] Inventors: Manfred Schindehütte, Kassel; Hans Dieling, Rhunda, both of Germany

[73] Assignee: Wegmann & Co., Kassel, Germany

[22] Filed: Apr. 16, 1973

[21] Appl. No.: 351,758

[30] Foreign Application Priority Data
Apr. 14, 1972  Germany.......................... 2218089

[52] U.S. Cl............. 105/135; 105/136; 105/182 R; 105/197 B; 105/453; 267/3
[51] Int. Cl.².... B61F 3/04; B61F 5/10; B61F 5/24; F16F 9/04
[58] Field of Search............ 105/135, 182 R, 197 B, 105/200, 210, 136, 453; 267/3, 4

[56] References Cited
UNITED STATES PATENTS

| | | | |
|---|---|---|---|
| 691,862 | 1/1902 | Herpolsheimer................ | 105/197 B |
| 2,288,383 | 6/1942 | Anderson......................... | 105/210 X |
| 2,908,230 | 10/1959 | Dean................................ | 105/200 X |
| 3,200,771 | 8/1965 | Dobson et al................... | 105/197 B |
| 3,427,993 | 2/1969 | Lich................................ | 105/200 X |
| 3,557,709 | 1/1971 | Hilfing et al. ................ | 105/197 B X |
| 3,646,893 | 3/1972 | Sundby ......................... | 105/182 R X |
| 3,786,763 | 1/1974 | Pollinger...................... | 105/199 R |

FOREIGN PATENTS OR APPLICATIONS

| | | | |
|---|---|---|---|
| 1,605,110 | 3/1971 | Germany......................... | 105/182 R |
| 1,605,136 | 3/1971 | Germany......................... | 105/182 R |
| 1,801,981 | 5/1970 | Germany ....................... | 105/135 |

Primary Examiner—Robert G. Sheridan
Assistant Examiner—Howard Beltran
Attorney, Agent, or Firm—Burgess, Dinklage & Sprung

[57] ABSTRACT

A rail vehicle, especially a passenger train car for high-speed trains provided with air springs associated with each swivel truck in symmetry with the longitudinal central plane, their distance from center to center being so much smaller than the track gauge of the wheels that, if one air spring bellows fails, the weight of the car body will be distributed to the wheels in such a manner that the unloading of the wheels on the one side will not be such as to create the danger of derailment. To stabilize the car body the latter is joined to the swivel truck frame by a resilient linkage which permits vertical movements of the car body but opposes any lateral tilt of the car body by means of a resilient force. The resilient linkage is able to cause the car body to tilt towards the inside of curves when the car is negotiating curves. The swivel truck can be designed either as a driving or as a non-driving truck.

6 Claims, 11 Drawing Figures

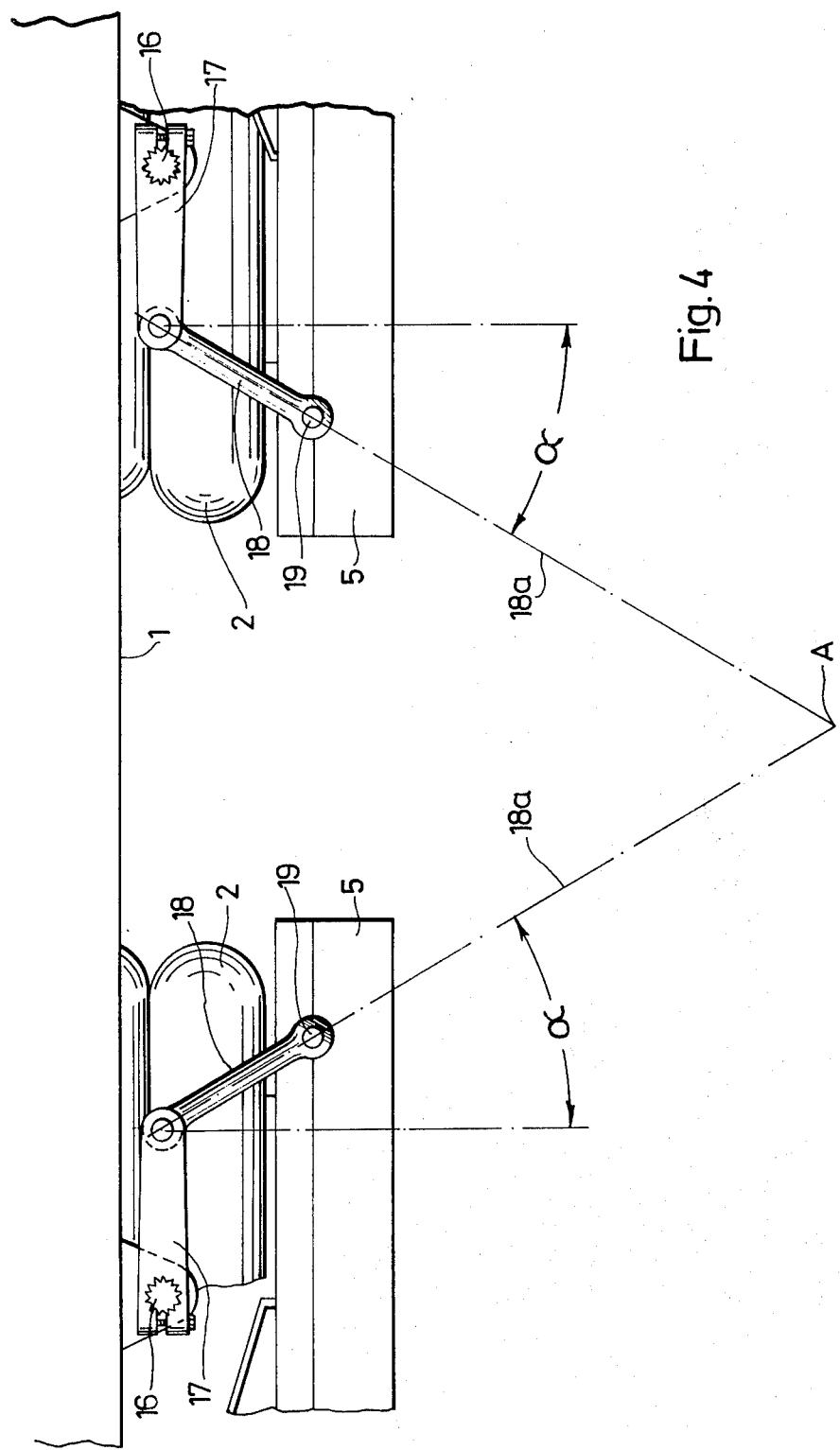

PNEUMATIC RAILWAY CAR SUSPENSION

BACKGROUND OF THE INVENTION

FIELD OF THE INVENTION

The invention relates to a rail vehicle with driving or non-driving swivel trucks, especially a passenger train car.

DISCUSSION OF BACKGROUND AND ATTENDANT PROBLEMS

In passenger train cars, especially cars for high-speed trains, the use of air springs, especially in the form of bellows springs, offers considerable advantages. These advantages consist mainly in the fact that air springing is a very soft springing which completely absorbs the shocks and vibrations of the trucks, so that they are not greatly perceptible in the car body, and that air springs are also capable of absorbing lateral displacements of the parts being biased by then, so that it is possible to locate air springs directly between the truck and the car body. These advantages are offset, however, by disadvantages. The soft springing causes poor sway stability. To improve the sway characteristics of the car, the air springs are located as far outwardly as possible, thereby creating the widest possible base, and the air springs are individually controlled by the compressed air system provided for level control, but the result is that the air spring valve responds to the swaying movements of the vehicle, especially on curves, in such a manner that more air is delivered through the valve into the one air spring while at the same time compressed air is escaping from the other. This results in a steady consumption of air which in the case of longer trains exceeds the capacity of the locomotive compressor.

Another very considerable disadvantage of air springs is that provision must be made for the possibility of an air spring bellows bursting en route. To this end it is arranged so that in this case the air springs symmetrically associated with the burst bellows will be deflated. It is nevertheless unavoidable that the one side of the truck will be completely unbiased momentarily, and this may allow the wheels to lift briefly away from the rails producing a derailment. The wider the distance between the air springs is, the greater will be the danger of derailment.

SUMMARY OF THE INVENTION

The disadvantages attendant the above discussed rail vehicles containing air springs are overcome by a rail vehicle with swivel trucks comprising at least two air springs disposed symmetrically with the longitudinal central plane of the rail vehicle between the car body and each swivel truck, the distance between the centers of the air springs being smaller than the track width of the wheels. The car body is suitably connected to the swivel truck by a resilient linkage consisting of a torsion bar disposed across the swivel truck cooperating with two horizontal levers, each of which is connected to the torsion bar via a substantially vertical connecting rod. Alternatively, the rail vehicle can be provided with an intermediate support which connects the car body and the swivel truck. This intermediate support can rest on friction pads on the swivel truck and can be provided with a linkage which impedes the turning of the intermediate support against the car body. The car body is connected to the intermediate support by a resilient linkage comprising a torsion bar, a pair of horizontal levers, each of which is connected to a substantially vertical connecting rod disposed between the horizontal levers and the truck frame and connecting the levers to the truck frame. Alternatively, the intermediate support can be connected to the swivel truck, as opposed to the car body, by a linkage impeding the turning of the intermediate support against the car. In such case, the car body would rest upon friction pads on the intermediate support and the intermediate support is connected to the swivel truck by a resilient linkage consisting of a torsion bar spring, two horizontal levers and two approximately vertical connecting rods.

At the heart of the present invention is the geometrical arrangement of the air springs. These air springs are desirably arranged so that the distance between them corresponds to a formula $$S \cdot v \cdot \left( \frac{G_1}{G_2} + 1 \right)$$

where $S$ represents the track gauge, $v$ the permissible wheel unloading in percent of normal load, $G_1$ is the weight of the swivel truck and $G_2$ the portion of the weight of the car body that is supported by the swivel truck. Generally, the distance between the center of two air springs is so much smaller than the track width that the portion of the total load transferred through one air spring, in the event of failure of the other, to the truck wheels on the side of which the air spring has failed, will not be less than 40 percent of the normal load.

In the invention the above-discussed disadvantages of air springs are overcome by selecting the narrowest possible spacing between the air springs in that the distance $a$ between the lines of action of the two air springs, which are symmetrical with the longitudinal central plans, will be substantially shorter than the track width S, and at the same time the car body is supported by resilient linkages on the truck, with the interposition of an intermediate support if desired. These resilient linkages connect the car body and the truck frames to one another such that vertical movements of the car body against the truck which are caused by the springing are not impeded, while a resilient force acts against any sidesway of the car body, as it will be further explained below. Owing to the fact that the distance between the air springs is diminished to a value that is smaller than the track width it is brought about that, if a spring bellows bursts, the full load of the car, which now bears on the other spring bellows, will be distributed to both sides of the truck in inverse proportion to the distances between the rims and the line of action of the air spring that is still in action. If it is assumed that a wheel unloading $v$ can be permitted up to a certain percentage of the normal load without creating danger of derailment (the German Federal Railways consider an unloading of up to 60 percent of the normal load to be allowable), and if it is further considered that the wheel load is composed of a percentage of the weight $G_1$ of the truck and a percentage $G_2$ of the weight of the car body, it will appear that if an air spring bursts the wheel load will not fall below the minimum if $$a = S \cdot v \cdot \left( \frac{G_1}{G_2} + 1 \right)$$

wherein $v$ represents the allowable wheel unloading in percent of the normal load, $G_1$ the weight of the truck and $G_2$ the percentage of the weight of the car body that is carried by this truck. Not considered in this formula are differences in wheel loading due to resilient deformation in the truck due to torsion.

The narrow base of the air spring spacing would have an undesirable effect on the sway characteristics of the car. These undesirable effects are eliminated by resilient linkages. Resilient linkages are known in steel spring swivel trucks, but they have not hitherto been used in air spring trucks because it was feared that they would have an undesirable effect on the vertical springing. It has been found that these objections to the use of resilient linkages in the new swivel truck have been far outweighed by the gain in safety due to the elimination of the danger of derailment. The invention also offers the additional advantage that the air spring bellows no longer have to be individually controlled, and that, instead, the two symmetrically disposed air springs can be connected directly together, and the compressed-air control system is required only for automatic leveling, and any air consumption that is involved will be only that which is required by changes in the loading. In this manner air consumption is very appreciably reduced, and long trains may be made up of such cars without exceeding the output of the locomotive compressor. The compressed-air control system is thus by and large simplified and less subject to trouble.

If it should become necessary to run without compressed air in the air springs owing to damage or to inadequate supply, an emergency springing system will still be required. This emergency springing must be flexible enough so that the wheel unloading on one side or the other will not exceed the maximum allowable, even on the maximum allowable track warp. The narrow air spring base provided by the invention brings it about that the spring movement necessary for the emergency springing, which is added to the air spring movement, becomes smaller, so that the space that must remain free between the car and the truck is reduced, and this has a good effect on the floor height of the vehicle. If an air spring bursts, the car drops down onto the emergency springs. This releases potential energy, and the greater the amount by which the car drops is, the greater is the release of potential energy. The reductions in the total spring movement also has a desirable effect here.

If a resilient linkage is provided which consists of a torsion bar with levers and connecting rods at both ends thereof, the connecting rods can be arranged so that, with the car running straight, they form an angle with the vertical such that downward extensions of the connecting rods of different trucks of the same car would intersect. It is thus accomplished that, when the car is running on a curve, the connecting rods on the outside of the arc will assume a steeper angle and will thus lift the car slightly on the outside, while on the inside of the arc the angle of the connecting rods with the vertical will be increased, so that the inner side of the car will be slightly lowered.

BRIEF DESCRIPTION OF DRAWINGS

Embodiments of the subject matter of the invention are shown in FIGS. 1 to 11. Referring to the drawings.

FIG. 4 shows another embodiment of the attachment of the resilient linkages and their intersecting axes.

DESCRIPTION OF EMBODIMENTS

Figure 1:
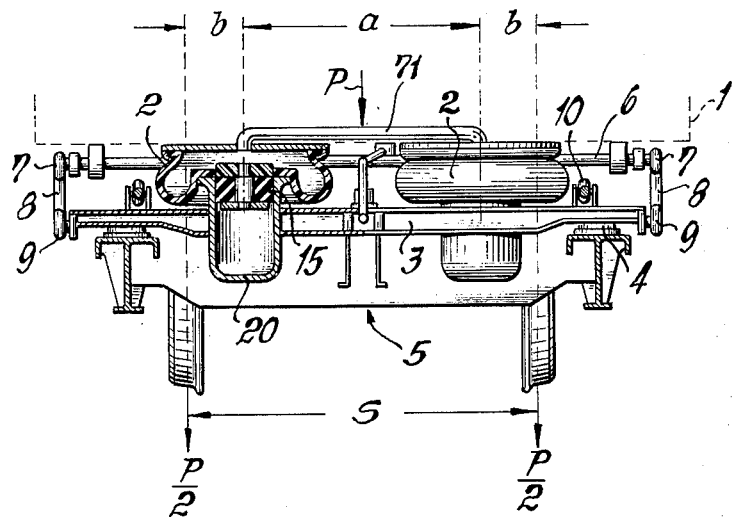
FIG. 1 is a cross sectional view through a rail vehicle with a swivel truck according to the invention, taken along line I—I of FIG. 2.
Figure 2:
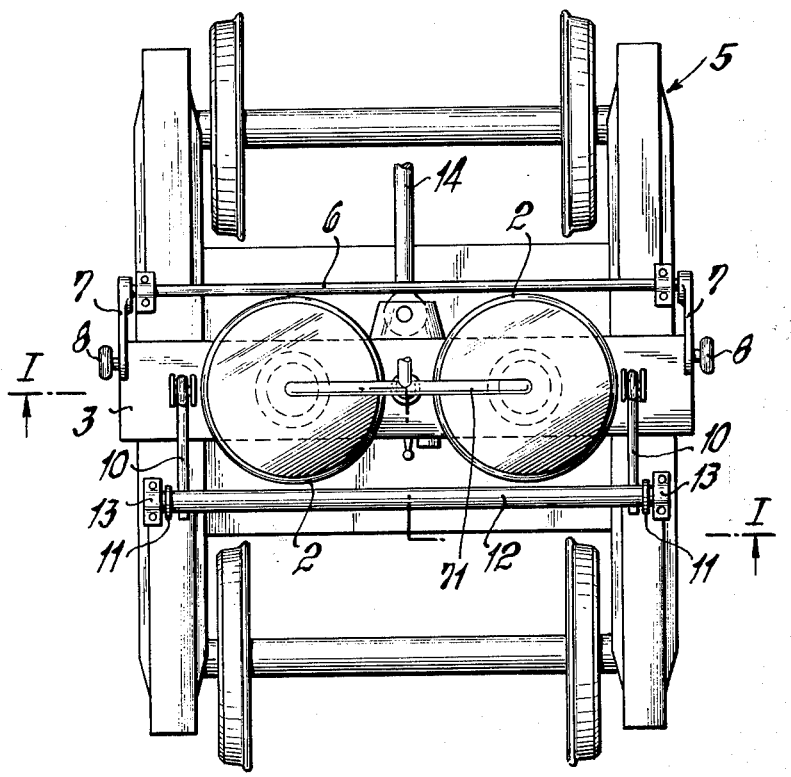
FIG. 2 is a top view of the swivel truck of the vehicle of FIG. 1 with the car body removed.
Figure 3:
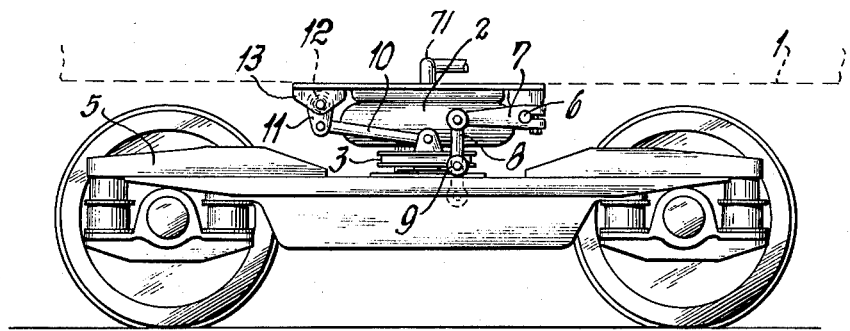
FIG. 3 is a side elevation view of the swivel truck of FIG. 1 and 2.

In the embodiment shown in FIGS. 1 to 3, the car body 1 is supported by air springs 2 on the intermediate support 3 which in turn is supported by friction pads 4 on the truck frame 5, which is constructed as a flexible truck frame. The distance $a$ between the lines of action (broken lines) of the two air springs 2 is, as shown in FIG. 1, shorter than the track width $S$, by the amount $b$ on either side. Since the two air spring bellows are in communication with one another and are at the same pressure, the weight P of the car body is evenly distributed between both wheels, so that the wheel load on each side amounts to P/2. If it is assumed that one of the two air bellows bursts, a state momentarily occurs in which the entire load P of the car body lies on the other air spring bellows and is distributed between the wheels in the ratio $b : (a + b)$. If the wheel load were determined solely by the weight of the car body, it would follow that, if the wheel pressure is not to drop below $0.4 \cdot P/2$, the distance $a$ would have to be equal to or less than $0.6 \cdot S$. If one also considers the weight $G_1$ of the swivel truck in relation to the share of the weight $G_2$ of the car body which falls on this frame, this limit value also has to be multiplied by $$\left(\frac{G_1}{G_2} + 1\right).$$

Since the relatively short distance $a$ between the air springs would result in an undesirable sway characteristic in the car body 1, a resilient linkage is provided which consists of the torsion bar 6, the horizontal levers 7 and the connecting rods 8 whose lower ends 9 are articulated either to the intermediate support 3 or to the swivel truck frame, as indicated by broken lines in FIG. 3. In the arrangement shown in FIG. 3, the connecting rods are perpendicular, which means that the swiveling of the truck will have no effect on the car body, because the connecting rods 8 will be deflected by the same amount on both sides of the car and therefore levers 7 will also be deflected downwardly at equal angles. A lateral tilting of the car body 1 against the truck, however, will be opposed by the resilient linkage, because in that case one of levers 7 will be turned upwardly and the other downwardly, thereby twisting the torsion bar 6.

If the passenger train car is one designed for very high speed, an anti-wobble system may additionally be provided. For this purpose the intermediate support 3 is connected by the horizontal levers 10 and the short vertical levers 11 to the non torquable tube 12 which is rotatable in the bearings 13 mounted on the car body 1. In this manner the intermediate support 3 is connected to the car body in such a manner that the springing of the car body is in no wise impaired, but the intermediate support is unable to turn against the car body when the swivel truck turns. The intermediate support 3 lies unsprung on the truck frame 5 through the friction pads 4, so that when the truck turns this friction must be overcome. Thus, the truck is able to negotiate curves, but the small movements produced by the sinusoidal wobbling of a swivel truck are impeded and thus sinusoidal wobble is greatly suppressed. The longitudinal traction of the swivel truck is provided in a conventional manner by a traction bar 14 whose one end is articulated to the truck and the other end to the car body.

The air springs 2 are provided with an emergency cushioning 15 which needs to have very little resilience, and due to the circumstance that the air springs are located inside of the track width an air tank 20 may be located directly beneath each air spring bellows to provide additional air volume.

FIG. 4 illustrates how the resilient linkage can provide car body control in such a manner that the car body will tilt inwardly on curves. In FIG. 4 the horizontal lever 17 is mounted on the one end of a torsion bar corresponding to the torsion bar 6 in FIGS. 1 to 3, and a connecting rod 18 is connected to this lever, this connecting rod being not perpendicular like the connecting rod 8 in FIGS. 1 to 3, but tilted at the angle $\alpha$. On straight track, the connecting rods 18 are parallel to one another on both sides of the car, but their lower ends 19, by which they are articulated to the swivel truck, are located closer to the center of the car than the upper ends. In other words, the extensions 18a of the connecting rods of two trucks on the same car will intersect at A under the center of the car, but on the outside of a curve it moves away from the center of the car, so that the car body is lowered on the inside of the curve and lifted up on the outside thereof.

Figure 5:
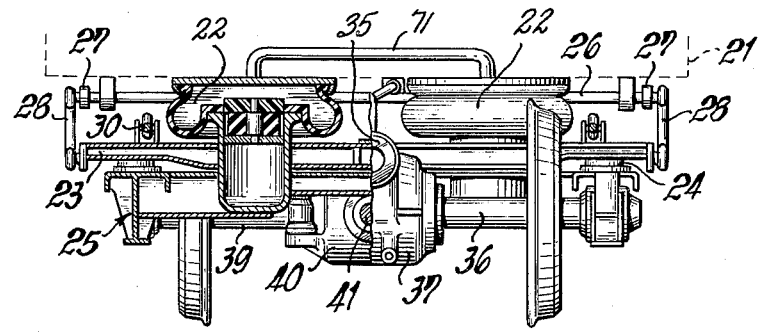
FIG. 5 is a front elevational view of a rail vehicle with a traction swivel truck in accordance with the invention, the left half being a cross sectional view taken along line V of FIG. 6.
Figure 7:
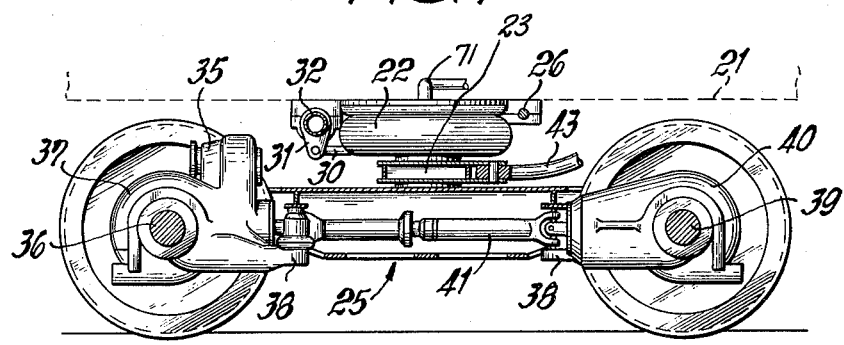
FIG. 7 is a longitudinal cross section through the swivel truck of FIGS. 5 and 6, the air spring bellows not being drawn in cross section.
Figure 6:
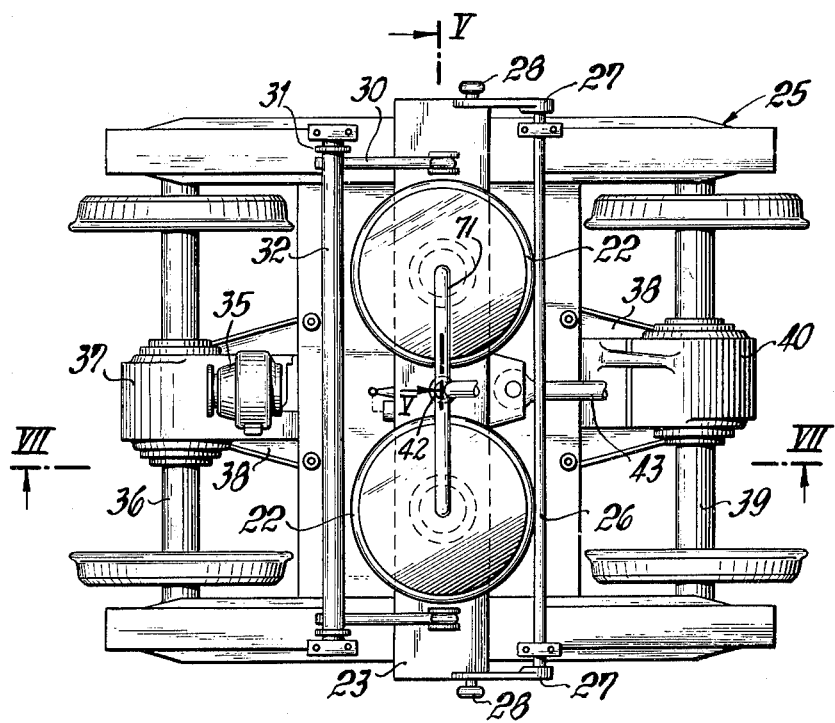
FIG. 6 is a top view of the swivel truck of FIG. 5 with the car body removed.

In the truck represented in FIGS. 5 to 7, traction is provided by a motor located in the car body and not shown in the drawings. As in the truck of FIGS. 1 to 3, the car body 21 is supported by means of air springs 22 on the intermediate support 23 which is supported on the friction pads 24 on the truck frame 25. As in the truck of FIGS. 1 to 3, the air springs 22 are set inwardly so far that the distance between their centers is considerably smaller than the track width. Also, as in the embodiment shown in FIGS. 1 to 3, the car body 21 is joined to the intermediate support 23 by a resilient linkage composed of the torsion bar 26, the levers 27 and the connecting rods 28. For especially high speeds of travel an anti-wobble system may again be provided, consisting of the non-torquable tube 32 and the vertical levers mounted at both ends thereof and the horizontal levers 30 connecting the vertical levers to the intermediate support 23.

The traction motor, which is not shown, and which is located in the car body, is connected by a universal shaft to the drive flange 35. The wheel axle 36 is driven by the traction gear 37 carried by wheel axle 36 and connected to the frame of truck 25 by the torque arms 38. The second wheel axle 39 is driven through a traction gear 40 which is connected to traction gear 37 by a universal shaft 41. Traction gear 40 is also joined to the swivel truck frame by a torque arm 38. The intermediate support 23 is centered on the car body by a center pin 42. The traction force is transmitted through a traction bar 43 whose other end, which is not shown, is articulated to the car body.

Figure 8:
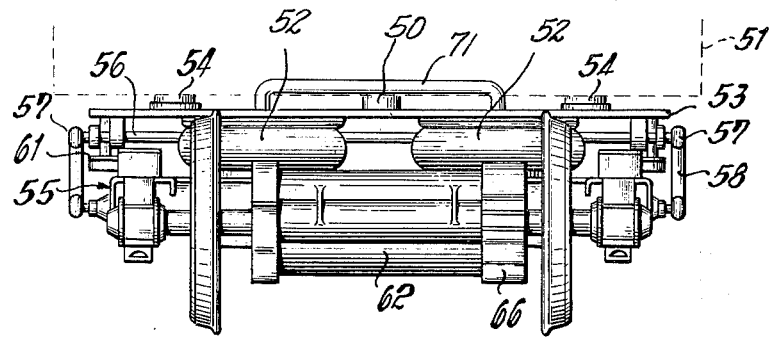
FIG. 8 is a front elevational view of a rail vehicle with an electrical traction truck in accordance with the invention.
Figure 10:
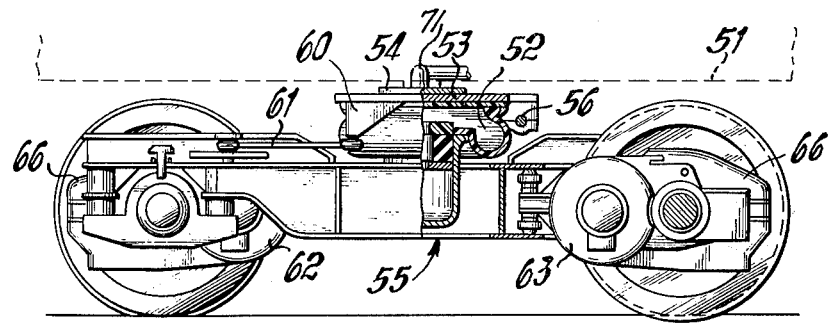
FIG. 10 is a partially side elevational, partly cross sectional view of the swivel truck of FIGS. 8 and 9.
Figure 9:
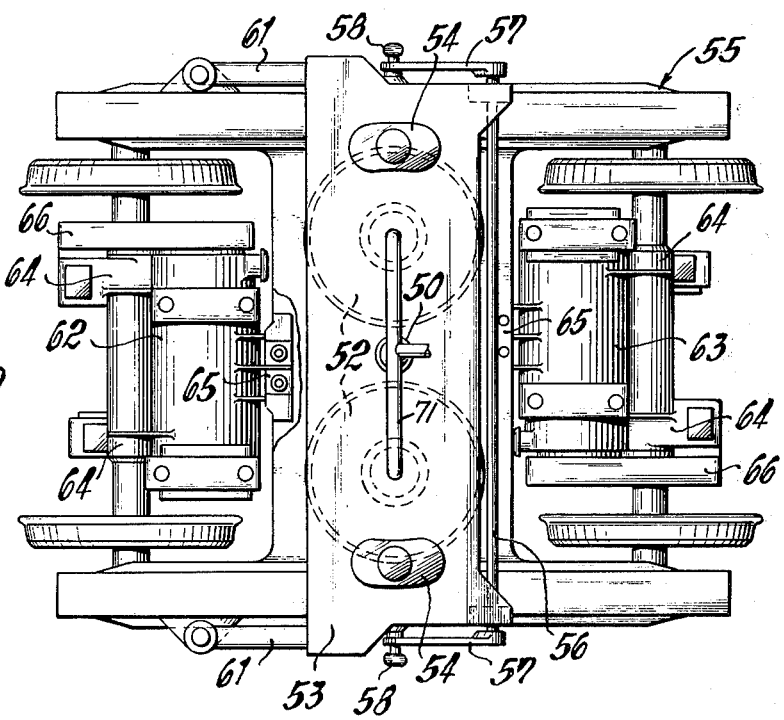
FIG. 9 is a top view of the swivel truck of FIG. 8 with the car body removed.

In the embodiment shown in FIGS. 8, 9 and 10, the car body 51 is supported directly through friction pads 54 on the intermediate support 53. The air springs 52 are located between the intermediate support 53 and the swivel truck 55. The intermediate support 53 is joined to the car body 51 by the swivel pin bearing 50. The intermediate support is attached to the truck frame 55 by the lug 60 which terminates in a pin, and the horizontal links 61, so that accelerating and braking forces are transmitted through the links 61 to the intermediate support and by the latter through the swivel pin bearing 50 to the car body. The resilient linkage again consists on the torsion bar 56, the levers 57 and the connecting rods 58.

Traction power is here provided by two electric motors 62 and 63. Each of these electric motors is mounted by means of two bearings 64 on the corresponding wheel axle and is fastened by means of a third bearing 65 to the frame of the swivel truck 55. This mounting is a flexible mounting, so that the motor will retain its position in relation to the wheel axle in spite of any twisting of the truck frame. The torque is transmitted from the motor to the wheel axle by means of a traction gear 66.

Figure 11:
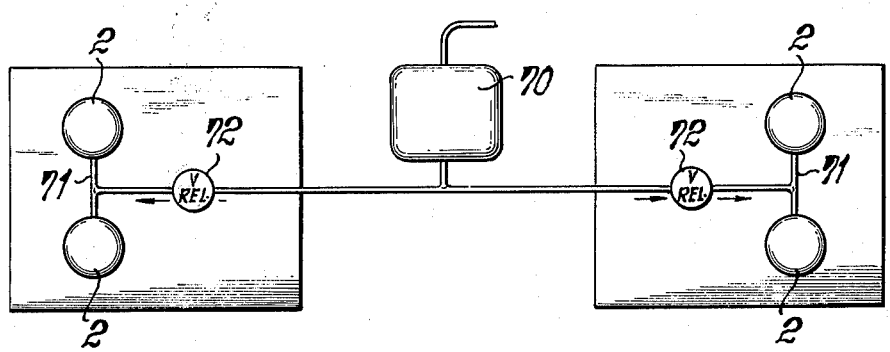
FIG. 11 is a diagrammatical representation of the air supply for the air springs of a rail vehicle in accordance with FIGS. 1 to 10.

The air supply system for the air springs is represented diagrammatically in FIG. 11. An air tank 70 is held at constant pressure by a compressor which is not illustrated. This compressor can be installed in the locomotive or in a rail motorcar so as to serve all of the cars in a train. The air springs 2 (the same applies to air springs 22 and 52) are connected directly together by an air line 71 in which there is no valve, so that the two air springs will always be at the same pressure. The air springs of each truck frame are supplied through a level regulating valve 72, which in a conventional manner controls the air pressure in the air springs in accordance with the loading of the car body, such that, as the loading increases, the pressure in the air springs is increased. If one of the air spring bellows of a truck burst, both air spring bellows empty and this truck then runs on the emergency cushioning 15 instead of the air spring. During the short period from the bursting of the first air spring bellows to the emptying of the corresponding air spring bellows, the weight of the car body transfers itself through the air spring that is not yet emptied, to the swivel truck frame, and since this load is located between the wheels, the wheels on the side on which the air spring bellows has burst are not completely unloaded; instead, a portion of the car weight still falls on these wheels, and this prevents the wheels from rising away from the rails and thereby derailing the vehicle.

What is claimed is:

1. A rail vehicle with swivel trucks comprising at least two air springs connected directly with one another through a clear passage and disposed symmetrically with the longitudinal central plane of said rail vehicle between a car body and each swivel truck, the distance between the centers of said air springs being smaller than the track gauge of the wheels, said air springs having connected thereto means for instantaneous discharge of air should one of said air springs fail, said car body being connected to said swivel truck by a stabilizing resilient linkage comprising a torsion bar disposed across said car body, said torsion bar connected rigidly at each end to a horizontal lever which extends lengthwise of said truck, each of said horizontal levers flexibly connected to a connecting rod which runs generally vertical and is connected at its opposite end from said horizontal lever to an intermediate support on the swivel truck frame or to the swivel truck frame itself.

2. A rail vehicle with swivel trucks according to claim 1, wherein said rail vehicle has an intermediate support disposed between said car body and said swivel truck, which intermediate support is connected to said car body by said linkage impeding the turning of the intermediate support against the car body and resting on friction pads on said swivel truck.

3. A rail vehicle with swivel trucks according to claim 1, wherein said connecting rods form an angle with the vertical in straight travel.

4. A rail vehicle with swivel trucks according to claim 1 wherein at least one swivel truck is a propulsion swivel truck, and comprises a traction motor connected to a first transmission on a first set of wheels, said transmission connected to a second set of wheels of said truck via a universal.

5. A rail vehicle with swivel trucks according to claim 1 wherein at least one of said swivel trucks is a propulsion swivel truck in which each wheel axle is driven by an electric motor which rests by means of bearings on the driven wheel axle and is connected by an additional bearing to the frame of said swivel truck.

6. A rail vehicle with swivel trucks according to claim 1 wherein at least one of said swivel trucks is a propulsion swivel truck in which each wheel axle is driven by an electric motor which rests by means of bearings on the driven wheel axle and is connected by an additional bearing to the frame of said swivel truck.

* * * * *